Patented Jan. 7, 1941

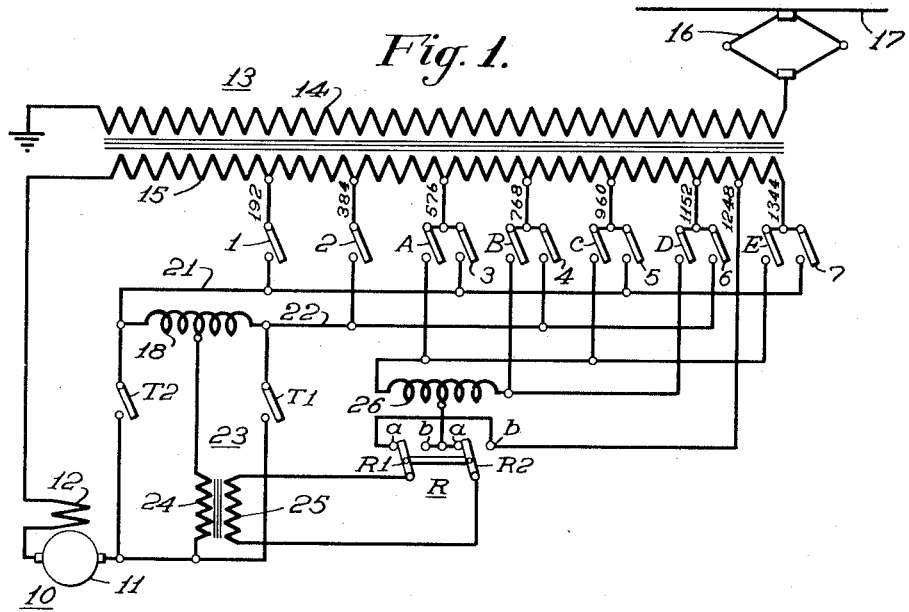

2,227,482

UNITED STATES PATENT OFFICE 2,227,482

LOCOMOTIVE CONTROL SYSTEM

Cyril E. Baston, Forest Hills, Pa., assignor to Westinghouse Electric & Manufacturing Company, East Pittsburgh, Pa., a corporation of Pennsylvania Application November 29, 1939, Serial No. 306,685

7 Claims. (Cl. 172—179)

My invention relates, generally, to control systems and, more particularly, to systems for controlling the operation of electric locomotives.

An object of my invention, generally stated, is to provide a tap-changing system for an alternating current locomotive which shall be simple and efficient in operation and which may be economically manufactured and installed.

A more specific object of my invention is to increase the number of accelerating steps in a tap-changing system without materially increasing the amount of switching equipment required.

Another object of my invention is to reduce sagbacks in the tractive effort of the motors of an electric locomotive during the tap-changing operations.

A further object of my invention is to prevent current surges during the acceleration of an alternating current locomotive.

Other objects of my invention will be explained fully hereinafter or will be apparent to those skilled in the art.

According to the present invention, the locomotive is accelerated by increasing the voltage applied to the traction motor by means of a plurality of main tap switches and a main preventive coil. A buck-boost transformer is utilized to divide each of the main notches in several equal parts. The voltage applied to the primary winding of the buck-boost transformer is controlled by a plurality of auxiliary tap switches and a reversing switch which are so operated that the voltage of the secondary winding changes from maximum in one direction through zero to maximum in the opposite direction.

For a fuller understanding of the nature and objects of the invention, reference may be had to the following detailed description, taken in conjunction with the accompanying drawing, in which:

Figure 1 is a schematic diagram of a control system embodying the invention, and Fig. 2 is a chart showing the sequence of operation of the switches illustrated in Fig. 1.

Referring to the drawing and, particularly, to Fig. 1, the system shown therein comprises a motor 10 having an armature winding 11 and a series field winding 12, a main transformer 13 having a primary winding 14 and a secondary winding 15, and a pantograph current collector 16 which engages a trolley conductor 17. The trolley conductor 17 may be energized from any suitable source of power, such as a power generating station (not shown).

It will be understood that more than one traction motor may be provided for propelling the locomotive (not shown) if desired. In order to simplify the drawing, only one motor has been shown in the present application. The locomotive is accelerated by varying the voltage applied to the traction motor circuit by means of seven main tap switches, numbered from 1 to 7 inclusive, and a main preventive coil 18. Alternate tap switches are connected to opposite legs of the preventive coil 18 through common buses 21 and 22. Thus, the tap switches 1, 3, 5, and 7 are connected to the common bus 21 and switches 2, 4 and 6 are connected to the common bus 22. In the embodiment of the invention illustrated, the voltage between taps on the secondary winding 15 is 192 volts. However, it will be understood that other voltages may be readily obtained by changing the design of the main transformer 13.

In order to divide the voltage between taps into several equal steps the center point of the main preventive coil 18 is connected through an auxiliary or buck-boost transformer 23 to the traction motor circuit. The secondary winding 24 of the buck-boost transformer 23 is wound for one-half of the main tap voltage, that is, 96 volts. The primary winding 25 is wound for 576 volts. In other words, the buck-boost transformer 23 has a 6 to 1 ratio of transformation. One terminal of the primary winding 25 is connected to a 1248 volt tap on the main transformer 13, and the other terminal is connected to the mid-point of an auxiliary preventive coil 26.

By means of the auxiliary preventive coil 26 and five auxiliary tap switches designated by the letters A to E the voltage applied to the primary winding 25 of the auxiliary transformer 23 may be varied from 576 volts to zero in four steps. A reversing switch R having two blades R1 and R2 connected together for simultaneous operation is utilized for reversing the polarity of the auxiliary transformer 23, thereby providing bucking and boosting voltages.

In order to reduce the duty imposed on the main tap-changing switches a pair of transition switches T1 and T2 is provided. The transition switches T1 and 2 are so operated that the tap-changing switches are opened under no-load equi-potential conditions during the notching sequence as transitions are made from one transformer tap to the next. Likewise, the tap switches are closed under no-load equi-potential conditions during the notching operations.

In order that the method of making a transition from one pair of tap switches to the next may be more clearly understood, reference may be had to the sequence chart shown in Fig. 2 which illustrates the sequence of operation of the foregoing switches. To accelerate the locomotive the main tap switches 1 and 2 are closed and also the auxiliary switches A and B. With the reversing switches R1 and R2 in position *a* the auxiliary transformer 23 provides a full bucking voltage of 96 volts, thereby resulting in a motor circuit voltage of 192 volts, as indicated in the sequence chart.

The voltage applied to the buck-boost transformer is reduced in three equal steps to zero by closing the auxiliary tap switches B, C, D and E in pairs as shown in the sequence chart. The reversing switches R1 and R2 can then be thrown to position *b* without any change in voltage conditions since both ends of the winding 25 are at the same potential. The voltage of the auxiliary transformer 23 is then built up to full boost by operating the auxiliary tap switches in the reverse order as shown in the chart. In this manner the motor circuit voltage is changed from 192 to 384 volts in six equal steps of 32 volts each. The motor circuit voltage is now equal to the voltage of No. 2 tap, that is, 384 volts, and the switch T1 is closed without appreciable tractive effort sagging or current surging since the switch connects equi-potential points.

Since the transition switch T1 shunts the preventive coil 18 and the auxiliary transformer 23 from the motor circuit, the tap switch 1 can be opened without interrupting the current and the reverser R thrown to the full buck or position *a* without causing a change in the voltage conditions in the motor circuit. When this has been accomplished the voltage across the main preventive coil will be 192 volts of the opposite polarity and, therefore, there will be a small or negligible voltage across the main tap switch 3, which can now be closed, and when closed will be carrying only the exciting current for the preventive coil 18.

If the transition switch T1 is now opened, the motor circuit voltage will not change appreciably and the motor current will be supplied through tap switches 2 and 3. The auxiliary transformer 23 is providing a full bucking voltage at this time. The notching up process is again repeated by closing the auxiliary switches A to E in the order shown in the sequence chart until full boost is reached when another transition is accomplished, utilizing the transition switch T2 instead of the switch T1.

The foregoing process is continued until the main tap switches 6 and 7 are closed and the auxiliary transformer 23 is operating under full boost conditions, thereby supplying a motor voltage of 1344 volts which is the maximum voltage obtainable with the particular main transformer illustrated. The acceleration is accomplished in 37 steps, the motor voltage being increased 32 volts on each step. In view of the fact that the continuation of the accelerating process is similar to that which is illustrated in the portion of the sequence chart shown, it is believed to be unnecessary to show the complete sequence chart in the present application.

It will be noted that the relatively large number of accelerating steps is obtained by utilizing only seven main tap switches and five auxiliary tap switches. The utilization of the reversing switch R greatly increases the number of accelerating steps obtainable with a given number of tap-changing switches since it permits all of the auxiliary tap switches to be utilized for both bucking and boosting operations, wherein, in previously known systems half of the auxiliary switches were utilized for bucking operation and the other half for boosting operation.

Furthermore, the present system permits the utilization of a higher voltage on the primary winding 25 of the auxiliary transformer 23 during both the bucking and the boosting operations, since the primary winding 25 may be connected across more of the turns of the secondary winding 15 of the main transformer than in other systems in which one terminal of the auxiliary transformer is connected to approximately the mid-point of the main transformer, which limits the voltage available for application to the buck-boost transformer to one-half the voltage of the main transformer. By utilizing a higher voltage on the auxiliary transformer 23 the current required to provide a given k. v. a. capacity is reduced thereby reducing the current carried by the auxiliary tap switches which permits a decrease in the size of the switches.

In view of the foregoing description, it is evident that I have provided a control system for controlling the acceleration of alternating current locomotives which provides a relatively large number of accelerating steps with a relatively small amount of equipment. Furthermore, since the duty imposed on the equipment is lowered, the size, weight, and cost of the equipment are reduced.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a main transformer, a motor energized from said transformer, a plurality of switches for changing taps on said transformer to vary the voltage on the motor, a part of said tap switches being connected to one common bus and the remainder of said tap swithes being connected to another common bus, a preventive coil connected across said common buses, an auxiliary transformer having a primary winding and a secondary winding, said secondary winding having one terminal connected to the mid-point of said preventive coil and the other terminal connected in the motor circuit, additional switches for connecting said primary winding to successive taps on the main transformer, and a switch for reversing the polarity of said auxiliary transformer, said polarity being reversed only after all of said additional switches have been operated.

2. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, additional switches for connecting said primary winding to successive taps on the main transformer, a switch for reversing the polarity of said auxiliary transformer, said polarity being reversed only after all of said additional switches have been operated, and a transition switch for shunting the preventive coil and the auxiliary transformer from the motor circuit during transition from one pair of tap switches to another.

3. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, additional switches for connecting said primary winding to successive taps on the main transformer, a switch for reversing the polarity of said auxiliary transformer, said polarity being reversed only after all of said additional switches have been operated, and a pair of transition switches for shunting the preventive coil and the auxiliary transformer from the motor circuit during transition from one pair of tap switches to another said transition switches being operated alternately.

4. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches for connecting said additional preventive coil to successive taps on the main transformer, and a switch for reversably connecting said primary winding to said additional preventive coil and the main transformer, the position of said switch being changed only after all of said additional switches have been operated.

5. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches for connecting said additional preventive coil to successive taps on the main transformer, said primary winding having one terminal connected to the mid-point of said additional preventive coil and the other terminal connected to the main transformer, and a switch for interchanging said primary winding connections to reverse the polarity of the auxiliary transformer, said polarity being reversed only after all of said additional switches have been operated.

6. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches for connecting said additional preventive coil to successive taps on the main transformer, said primary winding having one terminal connected to the mid-point of said additional preventive coil and the other terminal connected to the main transformer, and a reversing switch disposed in the circuit for said primary winding to reverse the polarity of the auxiliary transformer, said polarity being reversed only after all of said additional switches have been operated.

7. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, an additional preventive coil, additional switches for connecting said additional preventive coil to successive taps on the main transformer, said primary winding having one terminal connected to the mid-point of said additional preventive coil and the other terminal connected to the main transformer, a pair of reversing switches disposed in the circuit for said primary winding, and means for actuating said reversing switches simultaneously to reverse the polarity of the auxiliary transformer, said polarity being reversed only after all of said additional switches have been operated.

CYRIL E. BASTON.